(12) United States Patent
Krah et al.

(10) Patent No.: US 6,960,027 B1
(45) Date of Patent: Nov. 1, 2005

(54) METHOD OF FIXING A FERRULE TO AN OPTICAL WAVEGUIDE

(75) Inventors: Thorsten Krah, Altrip (DE); Juergen Bauer, Ingolstadt (DE); Stefan Loeffelholz, Lorsch (DE)

(73) Assignee: Tyco Electronics Logistics AG, Steinach (CH)

( * ) Notice: Subject to any disclaimer, the term of this patent is extended or adjusted under 35 U.S.C. 154(b) by 0 days.

(21) Appl. No.: 10/130,887

(22) PCT Filed: Apr. 26, 2000

(86) PCT No.: PCT/IB00/00521

§ 371 (c)(1),
(2), (4) Date: Sep. 3, 2002

(87) PCT Pub. No.: WO00/67056

PCT Pub. Date: Nov. 9, 2000

(30) Foreign Application Priority Data

Apr. 28, 1999 (DE) .......................... 199 19 428

(51) Int. Cl.$^7$ ............................... G02B 6/36
(52) U.S. Cl. ...................................... 385/78
(58) Field of Search .................... 385/78, 80, 81; 219/121.63, 121.64; 264/1.24, 1.25

(56) References Cited

U.S. PATENT DOCUMENTS

| | | |
|---|---|---|
| 3,424,890 A | 1/1969 | Van Ruyven |
| 3,769,117 A | 10/1973 | Bowen et al. |
| 4,176,909 A | 12/1979 | Prunier |
| 4,424,435 A | 1/1984 | Barnes, Jr. |
| 4,636,609 A | 1/1987 | Nakamata |
| 4,726,008 A | 2/1988 | Renaud |
| 4,859,827 A | 8/1989 | Coyle, Jr. et al. ....... 219/121.64 |
| 4,879,450 A | 11/1989 | Valentin et al. |
| 5,279,693 A | 1/1994 | Robinson et al. |
| 5,291,570 A | 3/1994 | Filgas et al. ................... 385/78 |
| 5,300,162 A | 4/1994 | Brockmeyer et al. |
| 5,501,759 A | 3/1996 | Forman |
| 5,568,581 A | 10/1996 | Johnson et al. |
| 5,888,331 A | 3/1999 | Greig |
| 5,893,959 A | 4/1999 | Muellich |
| 6,188,824 B1 * | 2/2001 | Teshima ..................... 385/126 |

FOREIGN PATENT DOCUMENTS

| | | | |
|---|---|---|---|
| DE | 28 01 603 A | 7/1978 | |
| DE | 2801603 A1 | 7/1978 | ............ G02B/5/14 |
| DE | 38 13 570 A1 | 11/1989 | |

(Continued)

OTHER PUBLICATIONS

Copy of German Search Report.
See PCT International Search Report for any references that are not enclosed herewith.
Andreas Weinert, "Kunststoff–lichtwellenleiter" (ISBN 3-89578–059–G), pp: 50–55 and 100–103. (Germany).
Vogel Verlag, "Fügen von Kunststoffen mit Diodenlasem verbessert di Nahtqualität" (1999), pp. 1–5. (Germany).

(Continued)

*Primary Examiner*—Chau N. Nguyen

(57) ABSTRACT

A ferrule (4) for an optical waveguide (1), according to the invention, is characterised in that the ferrule (4) is made of plastics material, and in that the ferrule (4) is for example more transparent than the casing (2, 3) of the optical waveguide (1). The process according to the invention, for fixing a ferrule (4) to an optical waveguide (1), includes the following steps: stripping certain regions of an outer casing (2) of one end of the optical waveguide (1) and exposing an inner casing (3) of the optical waveguide (1); pushing the ferrule (4) onto the stripped region of the optical waveguide (1); and welding the ferrule (4), at least in certain regions, onto the surface of contact with the inner casing (3) of the optical waveguide (1). Because of the transparency of this ferrule (4), the laser light can almost completely penetrate the ferrule (4) in the so-called transmission technique and take effect in the outermost region of the casing (2, 3) of the optical waveguide (1).

31 Claims, 2 Drawing Sheets

FOREIGN PATENT DOCUMENTS

| | | |
|---|---|---|
| DE | 38 22 429 A1 | 1/1990 |
| DE | 41 40 283 A1 | 6/1993 |
| DE | 4140283 A1 | 6/1993 ............ G02B/6/36 |
| DE | 42 25 679 A1 | 2/1994 |
| DE | 689 25 262 T2 | 12/1995 |
| DE | 44 32 081 A1 | 3/1996 |
| DE | 195 29 527 C1 | 10/1996 |
| DE | 19529527 C1 | 10/1996 ............ G02B/6/36 |
| DE | 197 46 402 A1 | 4/1999 |
| DE | 198 49 026 A1 | 4/2000 |
| DE | 19849026 A1 | 4/2000 ............ G02B/6/36 |
| DE | 199 19 191 A1 | 11/2000 |
| EP | 0 159 169 A2 | 10/1985 |
| EP | 0 365 180 B1 | 4/1990 |
| EP | 0 483 569 A1 | 5/1992 |
| EP | 0 590 394 A1 | 9/1993 |
| EP | 0 488 309 B1 | 5/1995 |
| EP | 1 029 650 A1 | 8/2000 |
| GB | 2 326 366 A | 12/1998 |
| JP | 63-137202 | 6/1988 |
| JP | 63137202 | 6/1988 ............ G02B/6/36 |
| JP | 63-216010 | 9/1988 |
| JP | 63216010 | 9/1988 ............ G02B/6/38 |
| JP | 63-228112 | 9/1988 |
| JP | 02-219008 | 8/1990 |
| JP | 05-233742 | 9/1993 |
| JP | 10-048462 | 2/1998 |
| JP | 63-137202 | 6/1998 |
| WO | WO 93/12049 | 6/1993 |
| WO | WO 94/12902 | 6/1994 |
| WO | WO 95/26869 | 10/1995 |
| WO | WO97/09811 | 3/1997 |
| WO | WO 99/02330 | 1/1999 |

OTHER PUBLICATIONS

Treusch, et al. "Laswerschweißen von Polymerteilen Qualitätsverbesserung von Polymerteilen durch Laserschweißen" *5th Plastic Manifold Forum* (1998), pp. 1–12.

Jones, et al., "Laser Sealing of Plastics for Medical Devices", *Medical Plastics 12th International Conference*, (1998). (Cambridge, UK).

Schweissmaschinen "Heizelementschweißen" *Kunststoffe*, vol. 87 (1997), pp. 1634–1640. (Germany).

H. Potente, et al., "Entwicklungstendenzen beim Laserschweißen von Kunststoffen" *Plastverarbeiter* vol. 6, No. 10 (1995), pp. 58–64. (Germany).

H. Potente, et al., "Laserstumpfschweißen" *Kunststoffe* vol. 87 (1997) 3, pp. 348–350. (Germany).

H. Potente, et al. "Laser–Durchstrahischweißen von PE–HD" *Kunststoffe* vol. 87 (1997) 5, pp. 590–594. (Germany).

* cited by examiner

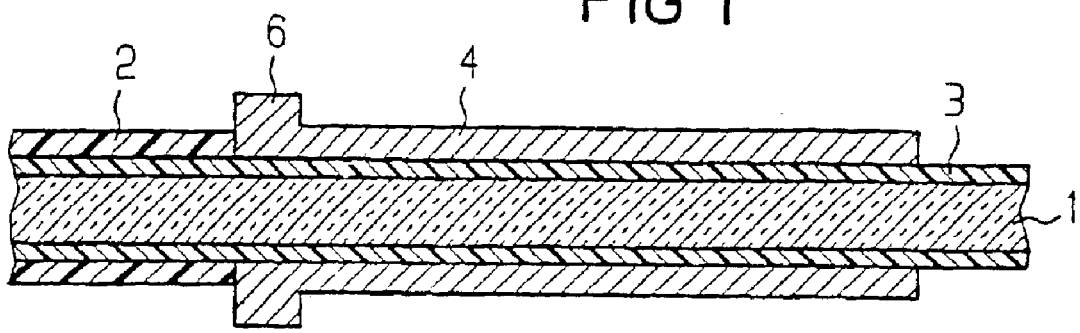
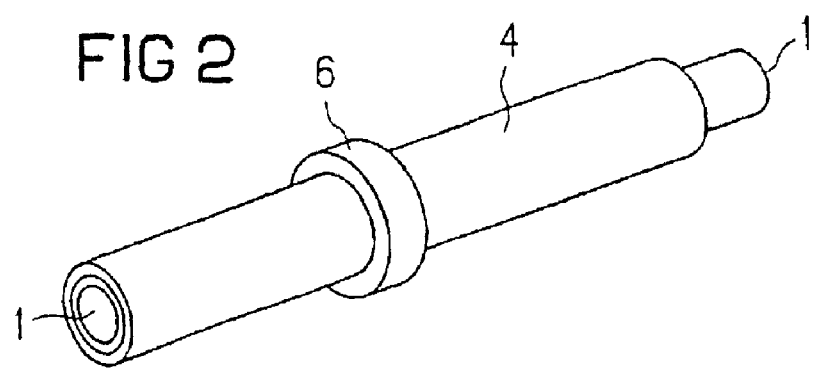
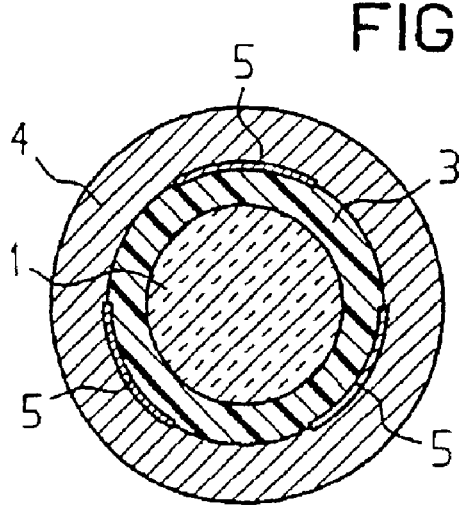

METHOD OF FIXING A FERRULE TO AN OPTICAL WAVEGUIDE

FIELD OF THE INVENTION

The present invention relates to a ferrule for an optical waveguide and a process for fixing a ferrule to an optical waveguide.

BACKGROUND OF THE INVENTION

When coupling electro-optical transmitters, such as LEDs and laser diodes, and electro-optical receivers, such as photodiodes and phototransistors, by means of a light-conducting fibre, or when optically connecting two separate optical waveguides (e.g. of plastics material) to one another, the problem arises that the end faces of the light-conducting fibres have to be brought into position with respect to the corresponding transmitting or receiving faces very precisely and held there. In so doing, the optical axes have to be brought into congruence precisely and adjoin one another very closely, that is to say that they have to be positioned precisely both in the radial and in the axial directions.

SUMMARY OF THE INVENTION

In order to ensure proper splicing of an optical waveguide to a transmitter or a receiver, or proper coupling fibre to fibre, in the case of the known optical plug connections the end of the optical waveguide is fitted with a small tube, a so-called ferrule (also called an insert).

The ferrule must be fixed to or on the optical waveguide in a manner secure against traction without damaging the optical waveguide or even affecting its optical properties.

Known means of fixing an optical waveguide to make a connection therewith include making a crimp connection to the optical waveguide. When doing this, there is however a risk that the optical waveguide will be damaged or the optical properties will be adversely affected.

In contrast to this, the object of the present invention is to provide a ferrule for an optical waveguide and to provide a process for fixing a ferrule to an optical waveguide, in which the ferrule is securely fixed to the optical waveguide to withstand large withdrawal forces, even when it is used in a motor vehicle. Moreover, as far as possible no optical blocking should occur and manufacture by means of the process should allow cycle times to be short and entail low costs.

This object is achieved by a ferrule for an optical waveguide which is made of plastic material, the ferrule being welded to a casing of the optical waveguide.

Furthermore, the process according to the invention for fixing a ferrule to an optical waveguide includes the following steps:

stripping certain axial regions of a casing of one end of the cylindrical optical waveguide and removing a radial part of the casing of the optical waveguide;

pushing the ferrule onto the stripped region of the optical waveguide; and welding the ferrule, at least in certain regions, onto the remaining casing of the optical waveguide.

In accordance with the present invention, the ferrule, which is made of a plastic material which is more transparent than the casing of the optical waveguide, which is also made of a plastic material, is preferably fixed to the optical waveguide by means of a laser weld at the surface of contact between the ferrule and the optical waveguide casing.

As a result of the transparency of this ferrule, the laser light can penetrate the ferrule almost completely by the so-called transmission technique and take effect in the outermost region (as seen radially) of the casing of the optical waveguide.

Moreover, the ferrule may also be fixed to the optical waveguide by a melt-through process, in which case the ferrule does not need to be transparent and for example a $CO_2$ laser is used by means of which the ferrule is melted through to or melted onto the casing of the optical waveguide.

The main advantages according to the present invention are as follows:

an extremely firm connection between the ferrule and the optical waveguide;

the ferrule can be manufactured at low cost by an injection moulding technique;

economic cable fitting and manufacture of the ferrule;

high level of automation is possible during assembly;

mounting the ferrule on the optical waveguide can be combined with finishing the end face of the optical waveguide; and the optical properties of the optical waveguide are not impaired.

BRIEF DESCRIPTION OF THE DRAWINGS

A ferrule for an optical waveguide, according to the invention, and the process according to the invention for fixing a ferrule to an optical waveguide are illustrated in the drawings, in which:

FIG. 1 shows a cross-sectional view of an optical waveguide having a ferrule placed on, in longitudinal section;

FIG. 2 shows a perspective view of the ferrule and part of the optical waveguide from FIG. 1;

FIG. 3 shows a cross-sectional view of the optical waveguide and the ferrule placed thereon, in radial section;

DETAILED DESCRIPTION OF THE PREFERRED EMBODIMENT

Figure 4:
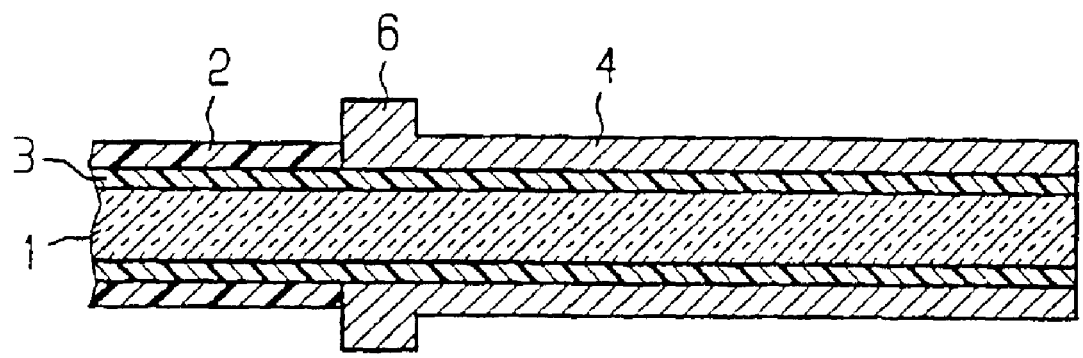
FIG. 4 shows a cross-sectional view similar to that of FIG. 1, but with an end face of the optical waveguide shortened so that it is flush with the length of the ferrule.

In FIG. 1, a ferrule 4 made of a plastics material is arranged on an optical waveguide 1 which is also made of a plastics material.

In the embodiment illustrated, the optical waveguide 1 has a light-conducting core and a two-shell casing which comprises an outer casing 2 and an inner casing 3.

This two-shell or two-layer structure of the casing of the optical waveguide 1, comprising outer casing 2 and inner casing 3, is not absolutely necessary for the present invention; the crucial point is that a certain buffer is available for attaching the ferrule 4, this buffer preventing damage to the core of the optical waveguide 1 during fixing of the ferrule 4.

In the case of the ferrule 4 shown in FIG. 1, therefore, first the outer casing 2 of the optical waveguide 1 is stripped from a region which corresponds approximately to the axial length of the ferrule 4. The stripped region is preferably slightly longer than the ferrule 4, with the result that a small part of the optical waveguide 1 projects beyond the ferrule 4. In FIG. 1, this projecting part of the optical waveguide 1 is illustrated on the right-hand side of the drawing.

At the left-hand end of the ferrule 4, there is constructed a collar 6. This collar 6 comes into abutment with the outer casing 2 when the ferrule 4 is pushed onto the optical waveguide 1.

Thus, the core of the optical waveguide 1 is protected by the inner casing 3 when the ferrule 4 is placed thereon.

In FIG. 2, the ferrule 4, placed on the optical waveguide 1, is illustrated in a perspective illustration. In this case, the optical waveguide 1 projects beyond the ferrule 4 on the right, while on the left-hand side of the illustration the optical waveguide is shown cut off.

The ferrule 4 is fixed to the optical waveguide 1 by means of a beam of laser light. In FIG. 3, for example, three regions 5 at which the weld connection is made have been drawn in. Depending on the strengths required of the connection between the ferrule 4 and the optical waveguide 1, more or fewer regions 5 and also the extent of these regions 5 may be varied.

The optical waveguide 1 and the ferrule 4 are connected permanently and non-detachably to one another by means of this laser beam welding. The welding is in this context carried out between the inner periphery of the ferrule 4 and the outer periphery of the inner casing 3.

When the ferrule 4 is actually welded to the inner casing 3 (protective casing for the core of the optical waveguide) of the optical waveguide 1, only the plastic material is melted at these two parts and there is no more than negligible impairment of the optical waveguide 1. Since the light-conducting fibre is not mechanically deformed, as for example in the case of crimping, no increase in the optical blocking is associated with it. The force for withdrawing the ferrule relative to the optical waveguide 1 is chiefly determined by the quality of the material connection and by the cross-section of the weld seam.

This weld seam may be produced with any number of lasers distributed in a circle around the ferrule 4, or by a central laser which then feeds a corresponding laser optics system.

Since the ferrule 4 is more transparent than the inner casing 3, it is possible to weld by the transmission technique, that is to say that the beam of laser light penetrates the transparent ferrule 4 almost unblocked and takes effect at the inner casing 3. There, it is absorbed into the uppermost layer of the inner casing 3, as a result of which the material is heated, melts and connects to the material of the ferrule 4.

For this transmission technique, the laser has to have a wavelength which is preferably in the near infrared range. Plastic materials for the ferrule 4 and the inner casing 3 of the optical waveguide 1 which on the one hand offer transparency, for the ferrule 4, and on the other hand absorb the light well, as the inner casing 3, are available.

The inner face of the ferrule 4 may have a smooth surface, or it may also be of a non-smooth construction, that is to say having depressions, cutouts, ribs, webs, etc. in order to facilitate welding. In particular, relatively small quantities of material such as that on a rib may be melted more easily and more quickly using the laser than a solid smooth surface.

Rapid welding has the advantage that the possibility of the core of the optical waveguide 1 being damaged can be ruled out.

Figure 5:
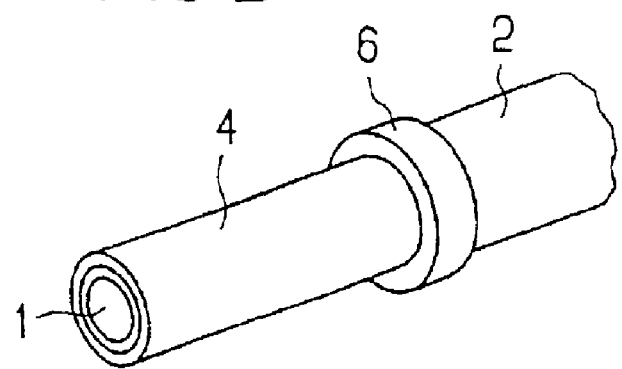
FIG. 5 shows a further perspective view of the ferrule and the optical waveguide from FIG. 4.

In FIGS. 4 and 5, the fully finished end piece of the optical waveguide 1 with the ferrule 4 is illustrated. The end face of the optical waveguide 1 is shortened to the length of the ferrule 4 and its end is finished.

The end face may be cut off, ground, or smoothed using a laser. In this last case, the same laser may be used as for the welding.

In the case where the ferrule 4 has no transparency, it may be necessary to use a laser in the far infrared range. In this case, the transmission technique is not used for welding, but rather the ferrule 4 is melted through from the surface as far as the casing. Both cutting of the ferrule 4 and welding of the ferrule 4 to the casing of the optical waveguide operate in the far infrared range.

Accordingly, a ferrule 4 for an optical waveguide 1, according to the invention, is characterised in that the ferrule 4 is made of plastic material and that the ferrule 4 is preferably more transparent than the casing 2, 3 of the optical waveguide 1. A process according to the invention, in accordance with an embodiment for fixing a ferrule 4 to an optical waveguide 1, includes the following steps: stripping certain regions of an outer casing 2 of one end of the optical waveguide 1 and exposing an inner casing 3 of the optical waveguide 1; pushing the ferrule 4 onto the stripped region of the optical waveguide 1; and welding the ferrule 4, at least in certain regions, onto the surface of contact with the inner casing 3 of the optical waveguide 1. As a result of the transparency of this ferrule 4, the laser light is able to almost completely penetrate the ferrule 4 in the transmission technique and take effect in the outermost region of the casing 2, 3 of the optical waveguide 1.

As regards further features and advantages of the present invention, the reader is explicitly referred to the associated drawings and claims.

What is claimed is:

1. A ferrule for an optical waveguide being made of plastic material and being weldable to a casing of the optical waveguide, the ferrule comprising a laser weld using a transmission technique for fixing the optical waveguide thereto wherein the ferrule is more transparent than the casing.

2. A ferrule according to claim 1, wherein the ferrule has substantially a hollow cylindrical shape, with the optical waveguide extending through the hollow shape.

3. A ferrule according to claim 1 wherein the ferrule has a non-smooth surface in the region of contact with the optical waveguide.

4. A ferrule according to claim 1 wherein the ferrule has a smooth surface in the region of contact with the optical waveguide.

5. A ferrule according to claim 1 wherein the ferrule is manufactured by injection moulding.

6. A ferrule according to claim 1 further comprising a collar at the end opposite the end of the optical waveguide.

7. A ferrule according to claim 1 wherein the laser weld is carried out at least in certain regions in the region of contact between the ferrule and the optical waveguide.

8. A process for fixing a ferrule to an optical waveguide, comprising the steps of:

stripping certain axial regions of one end of the cylindrical optical waveguide, with part of a casing of the optical waveguide being radially removed;

pushing the ferrule onto the stripped region of the optical waveguide; and welding the ferrule, at least in certain regions, onto the surface of contact with the remaining casing of the optical waveguide, welding the ferrule to the optical waveguide by means of a laser beam; and welding by means of a transmission technique, the ferrule being substantially transparent to the laser light used and the casing of the optical waveguide substantially absorbing the laser light used.

9. A process according to claim 8, further comprising the step of:

manufacturing the ferrule from a plastics material.

10. A process according claim 8, further comprising the step of:

manufacturing the ferrule by means of an injection moulding process.

11. A process according to claim 8 further comprising the step of:

manufacturing the optical waveguide from a plastic material.

12. A process according to claim 8 further comprising the step of:

manufacturing the casing, which comprises an outer casing and an inner casing, from a plastic material.

13. A process according to claim 8, further comprising the step of:

using a laser having a wavelength of laser light in the near infrared range.

14. A process according to claim 8, wherein welding is accomplished using a $CO_2$ laser.

15. A process according to claim 8 further comprising the step of:

arranging a plurality of lasers placed in a circle at the periphery of the ferrule.

16. A process according to claim 8 further comprising the step of:

arranging a laser and arranging a laser optics system for distributing the laser light of the laser over the periphery of the ferrule.

17. A process for fixing a ferrule to an optical waveguide, comprising the steps of:

stripping axial regions of one end of the optical waveguide removing part of a casing of the optical waveguide;

pushing the ferrule which is substantially transparent to laser light onto the stripped region of the optical waveguide; and welding the ferrule to the casing using a laser having a wavelength of laser light in the near inferred range.

18. A process according to claim 17, further comprising the step of:

manufacturing the ferrule from a plastic material.

19. A process according claim 17, further comprising the step of:

manufacturing the ferrule by means of an injection moulding process.

20. A process according to claim 17 further comprising the step of:

manufacturing the optical waveguide from a plastic material.

21. A process according to claim 17 further comprising the step of:

manufacturing the casing, which comprises an outer casing and an inner casing, from a plastic material.

22. A process for fixing a ferrule to an optical waveguide, comprising the steps of:

stripping axial regions of one end of the optical waveguide removing part of a casing of the optical waveguide;

pushing the ferrule which is substantially transparent to laser light onto the stripped region of the optical waveguide; and welding the ferrule to the casing by arranging a plurality of lasers placed in a circle at periphery of the ferrule.

23. A process according to claim 22, further comprising the step of:

manufacturing the ferrule from a plastic material.

24. A process according claim 22, further comprising the step of:

manufacturing the ferrule by means of an injection moulding process.

25. A process according to claim 22 further comprising the step of:

manufacturing the optical waveguide from a plastic material.

26. A process according to claim 22 further comprising the step of:

manufacturing the casing, which comprises an outer casing and an inner casing, from a plastic material.

27. A process for fixing a ferrule to an optical waveguide, comprising the steps of:

stripping axial regions of one end of the optical waveguide removing part of a casing of the optical waveguide;

pushing the ferrule which is substantially transparent to laser light onto the stripped region of the optical waveguide; and welding the ferrule to the casing by arranging a laser and arranging a laser optic system for distributing the laser light of the laser over the periphery of the ferrule.

28. A process according to claim 27, further comprising the step of:

manufacturing the ferrule from a plastic material.

29. A process according claim 27, further comprising the step of:

manufacturing the ferrule by means of an injection moulding process.

30. A process according to claim 27 further comprising the step of:

manufacturing the optical waveguide from a plastic material.

31. A process according to claim 27 further comprising the step of:

manufacturing the casing, which comprises an outer casing and an inner casing, from a plastic material.

* * * * *